UNITED STATES PATENT OFFICE.

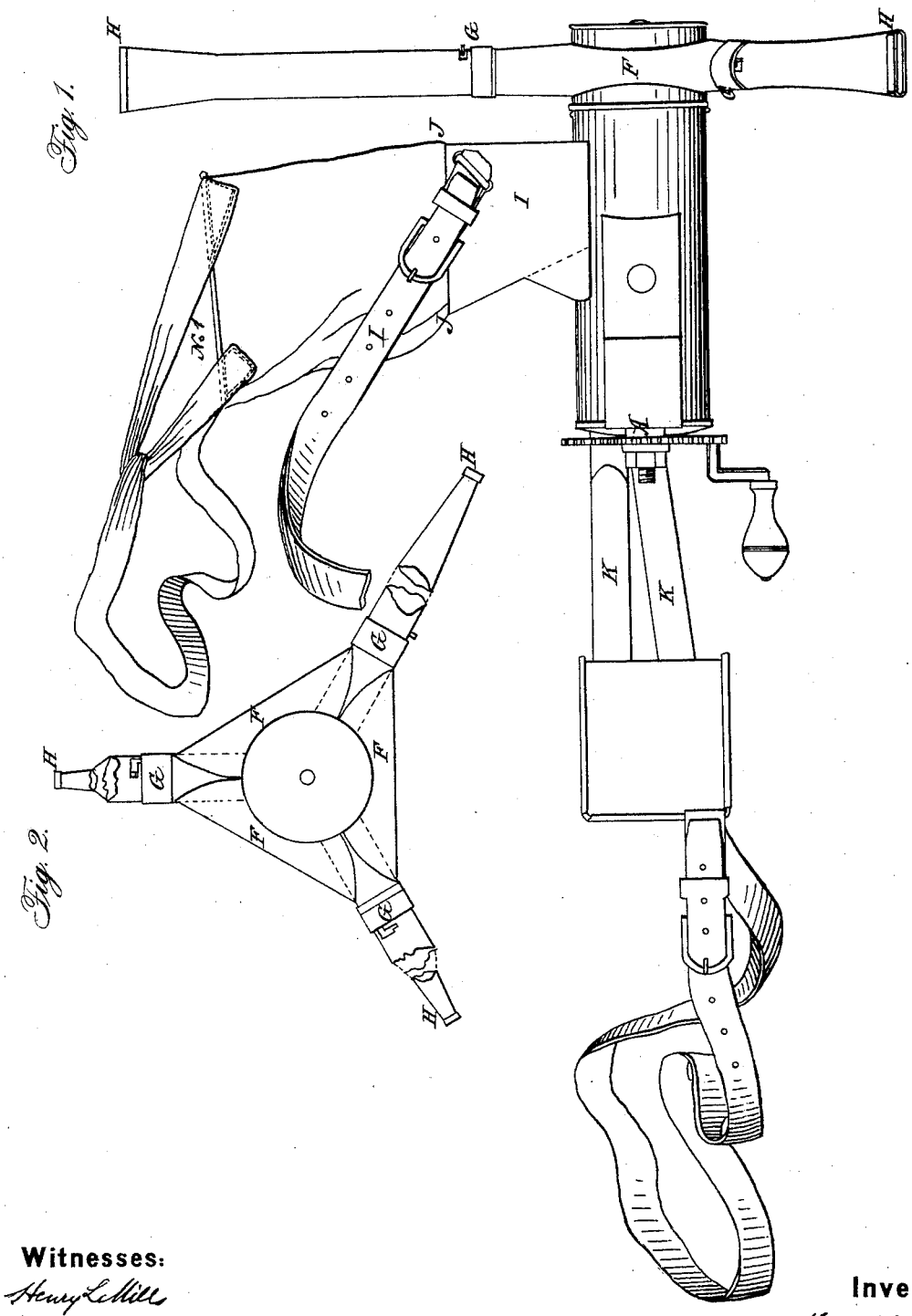

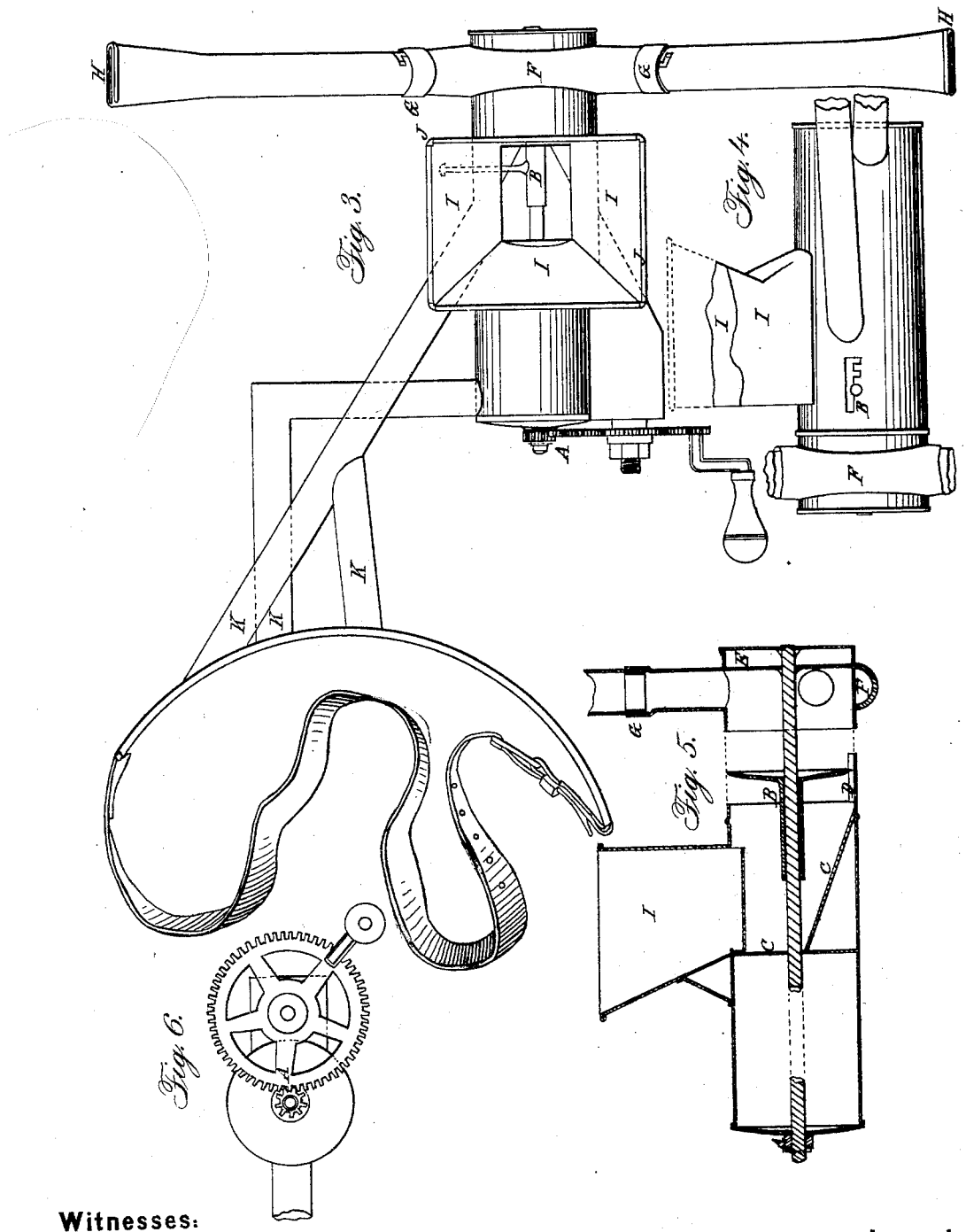

A. R. ROOT, OF KEOKUK, IOWA, ASSIGNOR TO RUFUS S. RICKEY, OF SAME PLACE.

IMPROVEMENT IN SEEDING-MACHINES.

Specification forming part of Letters Patent No. 23,430, dated March 29, 1859.

*To all whom it may concern:*

Be it known that I, ALONZO R. ROOT, of the city of Keokuk, in the county of Lee and State of Iowa, have invented new and useful Improvements on a certain machine known as the "Ring Patent Seed-Sower," patented by A. Ring, Esq., of Portland, Maine, on March 2, 1858; and I do hereby declare that the following is a full, clear, and exact description of the construction and operation of the said improvements as applied to the said machine, reference being had to the accompanying drawings, making a part of this specification, in which—

Figure 1 is a right side elevation; Fig. 2, a front end elevation; Fig. 3, a view looking down from above; Fig. 4, a left side elevation; Fig. 5, a longitudinal vertical section through center of the cylinder; Fig. 6, a view of rear end of cylinder and of cog-wheel, showing the relative position of cog-wheel to pinion and to the cylinder, all of said drawings being intended to represent the machine as it will appear with the improvements applied.

My seed-sower is composed of the following parts:

First. A cog-wheel running into a pinion fastened on the rear end of the shaft that revolves the head and arms, in order to increase their velocity by the same expenditure of labor. Said improvement is shown at A in Figs. 1, 3, 5, and 6.

Secondly. Substituting for the slide used by Mr. Ring a circular regulator of tin playing upon the shaft and traversing the cylinder like a piston, and moved by an arm projecting through the circumference of the cylinder, which is indented where the arm of the regulator projects, in order to gage more accurately the quantity of seed to be sown to the acre. Said improved regulator is shown by letter B, Figs. 3, 4, and 5.

Thirdly. Two pieces of tin in conducting the seed from the hopper down into cylinder, one piece in a perpendicular position, the other slanting, instead of only one piece of tin standing obliquely, as used by Mr. Ring. This change is made in order to prevent the seed entering the hole through which the shaft revolves, because of its being too large for shaft, and thereby impeding its revolutions, which cannot be avoided while the shaft passes through a piece of tin set in an oblique position. This improvement is shown at C, Fig. 5.

Fourthly. Attaching a projecting piece of tin nearly semicircular to the lower side of the front end of the cylinder, where it enters the revolving head, so that the seed will not enter the tubes or arms while they point perpendicularly to the ground, thus preventing the seed from being sown too thickly where the sower walks. This piece of tin is represented by the letter D in Fig. 5.

Fifthly. Using a double front end to the revolving head in order to insure greater firmness to the fastenings of the shaft, which in Mr. Ring's machine was sometimes actually torn loose by the want of strength in the single thickness of tin forming the front end of the revolving head. This improvement is shown at E in Fig. 5.

Sixthly. Putting the braces, as seen, between the tubes or arms in order to strengthen the arms, which in Mr. Ring's machine are broken by a very slight strain, and in order, further, to keep the revolving head in its proper shape and render it firmer. These braces appear by letter F in Figs. 1, 2, 3, 4, and 5.

Seventhly. Attaching the arms to the head as bayonets to muskets, for the purpose of making the arms stronger, and chiefly that they may be removed for transportation, by means of which very many of them are often broken off. This change is shown at G in Figs. 1, 2, 3, and 5.

Eighthly. Hemming the ends of the tubes in order to impart firmness. This is shown at H in Figs. 1, 2, and 3.

Ninthly. The square-topped hopper, as shown by letter I in Figs. 1, 3, and 5.

Tenthly. Lengthening the tubes which unite the machine to the plate which rests against the body of the sower, in order to give him more room for turning the crank, and in bracing the said uniting-tubes by soldering them together and by a brace running from tubes to said plate. These changes are shown at K in Figs. 1 and 3.

Eleventhly. Attaching straps on each side of hopper to pass over the right shoulder and under the left arm, in order to relieve the neck from the whole burden of grain that is being sown, which is sometimes oppressive. This change is shown at L, Fig. 1.

Having thus enumerated the component parts of my improved seed-sower, and to enable others skilled in the art to make and use my improvements, I will proceed to describe their construction and, where necessary, their operation.

The cog-wheel and pinion are both cast of brass. The former is four inches in diameter, one-fourth of an inch thick; the cogs thereof, one-fourth of an inch in pitch; hub of same, one and one-fourth inch long; the hole through hub, one-fourth inch in diameter. The hole into which the crank is inserted is near edge of cog-wheel, and is one-fourth of an inch square. The pinion is one inch in diameter, one-fourth of an inch thick; hub, one-half an inch long, the cogs thereof one-fourth of an inch in pitch. The pinion is fixed on the rear end of the shaft which revolves the revolving head, by means of a pin passing through the hub and shaft. This prevents the pinion from turning on the shaft, and, further, permits the taking apart of the machine. The cog-wheel is to the right of the pinion, and is held in its place by a shaft, which is fixed firmly in a tin box, soldered to the right side of cylinder, and on the end of said shaft, back of said wheel, is a screw-nut. By this arrangement the crank is fixed to the cog-wheel instead of to the shaft which turns the head. This cog-wheel plays into the pinion on the end of the shaft last mentioned, thereby increasing its velocity and the velocity of the head much beyond the velocity of said shaft and head which would be attained by the same power applied to the machine of Mr. Ring. This improvement prevents fatigue in the sower and enables the machine to be used with shorter arms, which is very desirable to short persons or for sowing in rough ground, where the sower in lifting his foot is apt to strike his knee against the revolving arms.

The regulator is a simple piece of tin a little convex toward the sower, which moves in the cylinder and head, which is pierced the size of the shaft, and to which is soldered a tube of tin playing upon the shaft. To the left side of this tube is soldered a short wire handle, by means of which the regulator, with the attached tube, may be moved backward and forward upon the shaft. This handle projects from the left side of the cylinder and falls into the notches on the cylinder, which notches make a gage by which the quantity of seed to be sown on a certain quantity of land may be fixed. The two pieces of tin for conveying the seed from hopper down into the bottom of cylinder are made and fixed as follows: Immediately in the rear of the opening in cylinder for the hopper is fixed a round piece of tin, upright and of same diameter as cylinder. This tin is pierced for passage of shaft closely, and has a washer on side next the sower. The other piece of tin required is set obliquely against the first in a line just below the hole in first through which the shaft plays. It slopes toward the head, and is soldered to the sides of the cylinder and to the perpendicular piece first named. This arrangement has great tendency to prevent the seed entering the hole through which the shaft passes, and thereby impeding its revolutions, which is the more apt to be so in Mr. Ring's machine, where the hole aforesaid is immediately under the hopper. The piece of tin projecting into the head from the cylinder is one and one-half inch long, one and one-fourth inch wide, soldered on the inside of cylinder at front end. This operates to prevent the seed entering the tubes or arms when pointing directly to the earth, which is the case in Mr. Ring's machine.

The double front end of revolving head I make of tin, both pierced by shaft in center. The inner piece is soldered in the cylinder, just in front of the openings from head into the arms. The outer and front piece makes the visible front end which closes up the cylinder. The shaft is soldered firmly into both of these pieces.

The braces on arms I make of tin, reaching from arm to arm and soldered to the arms and to the revolving head. These impart much greater strength to the arms. The arms are attached on the principle used in fastening bayonets to muskets, and this needs no explanation.

The square hopper I make of four pieces of tin, double-seaming them together. It is six by seven inches at top and two by three inches at bottom. I brace on rear side, thus making it much firmer. I edge or hem the tin for end of arms before forming it into the arms. This hemming imparts firmness and prevents the ends from being crushed by slight causes.

The lengthening of the connections between the machine proper and the body-plate operates to give the sower more room for the use of his arm in turning the crank, thus imparting a freer and less constrained motion to him. I further render those connections stronger by soldering them together (they are apart in Mr Ring's machine) and by putting a brace of tin tubing from one of the connecting-tubes to the plate resting against the body of the sower.

To attach the strap for passing over the shoulder to the hopper, I make two strong wire loops, fix them in eyes or fastenings, which are soldered to the right and left sides of the hopper. In these wire loops are fastened the straps. This improvement operates to relieve the neck of the sower of the great weight which in Mr. Ring's machine presses upon it.

I do not claim the invention of the "revolving head" of Mr. Ring, nor the application of the centrifugal force to the purpose of seed-sowing, nor any other principle secured to A. Ring, esq., by Letters Patent; but What I do claim as my invention, and desire to secure by Letters Patent, is—

1. In combination with the hopper I and the revolving tubes or arms, the regulator B, constructed and operating therewith, substantially as described.

2. In combination with the regulator and revolving tubes or arms, the vertical and inclined partitions C C and lip D, for the purpose of directing the seed to be sown from the hopper to the openings in the arms or tubes, and to prevent the seed from escaping unduly through the arm or tube for the time being immediately under the lip, substantially as herein described.

ALONZO R. ROOT.

Witnesses:
H. H. McCABE,
LLOYD D. SIMPSON.